United States Patent
Kunz et al.

(10) Patent No.: US 9,718,451 B2
(45) Date of Patent: Aug. 1, 2017

(54) MONITORING DEVICE FOR AT LEAST ONE SUBUNIT OF A HYDRAULIC BRAKING SYSTEM AND METHOD FOR EXAMINING A FUNCTIONAL CAPABILITY OF AT LEAST ONE SUBUNIT OF A HYDRAULIC BRAKING SYSTEM

(75) Inventors: Michael Kunz, Steinheim an der Murr (DE); Ralf Kinder, Ilsfeld (DE); Tobias Spoeri, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 14/130,979

(22) PCT Filed: May 10, 2012

(86) PCT No.: PCT/EP2012/058601
§ 371 (c)(1),
(2), (4) Date: Apr. 22, 2014

(87) PCT Pub. No.: WO2013/007417
PCT Pub. Date: Jan. 17, 2013

(65) Prior Publication Data
US 2014/0236419 A1 Aug. 21, 2014

(30) Foreign Application Priority Data
Jul. 8, 2011 (DE) .................. 10 2011 078 890

(51) Int. Cl.
*G06F 7/00* (2006.01)
*B60T 17/22* (2006.01)
*B60T 8/88* (2006.01)

(52) U.S. Cl.
CPC ............ *B60T 17/221* (2013.01); *B60T 8/885* (2013.01); *B60T 17/22* (2013.01);
(Continued)

(58) Field of Classification Search
CPC ........ B60T 14/221; B60T 8/885; B60T 17/22; B60T 2270/404; B60T 2270/413
See application file for complete search history.

(56) References Cited

U.S. PATENT DOCUMENTS

| 2,637,201 A | 5/1953 | Meier |
| 3,948,568 A | 4/1976 | Leiber |

(Continued)

FOREIGN PATENT DOCUMENTS

| DE | 10357764 | 3/2005 |
| DE | 10 2008 003 664 | 7/2009 |

(Continued)

OTHER PUBLICATIONS

International Search Report issued in PCT/EP2012/058601, dated Jul. 20, 2012.

*Primary Examiner* — Ian Jen
(74) *Attorney, Agent, or Firm* — Norton Rose Fulbright US LLP; Gerard Messina

(57) ABSTRACT

A monitoring device for, and a method for examining a functional capability of, at least one subunit of a hydraulic braking system includes: ascertaining at least one pressure variable of a pressure prevailing in the hydraulic braking system, and comparing the ascertained pressure variable to a predefined comparative value range, at least if the ascertained pressure variable deviates from the predefined comparative value range, a pressure change variable with respect to a time change of the pressure variable being ascertained and the ascertained pressure change variable being compared to a predefined minimum change variable, and the functional capability being established in consideration of the comparison of the pressure variable to the predefined comparative value range, and, at least if the ascertained pressure variable deviates from the predefined comparative (Continued)

value range, in consideration of the comparison of the pressure change variable to the predefined minimum change variable.

9 Claims, 3 Drawing Sheets

(52) U.S. Cl.
CPC ... *B60T 2270/403* (2013.01); *B60T 2270/404* (2013.01); *B60T 2270/413* (2013.01)

(56) References Cited

U.S. PATENT DOCUMENTS

| | | | | |
|---|---|---|---|---|
| 4,538,228 A * | 8/1985 | Brearey | ............... | B60T 8/1705 303/122.09 |
| 4,672,547 A * | 6/1987 | Masaki et al. | ............... | 701/80 |
| 4,680,713 A * | 7/1987 | Kubo | ............... | B60T 8/17616 303/176 |
| 4,712,839 A * | 12/1987 | Brearley et al. | ............... | 303/3 |
| 5,405,182 A * | 4/1995 | Ewe et al. | ............... | 303/15 |
| 5,683,149 A * | 11/1997 | Aizawa et al. | ............... | 303/10 |
| 5,810,455 A * | 9/1998 | Noguchi | ............... | 303/9.62 |
| 5,923,163 A * | 7/1999 | Stuible et al. | ............... | 324/160 |
| 5,951,118 A * | 9/1999 | Soejima | ............... | B60T 8/36 303/113.1 |
| 5,967,627 A * | 10/1999 | Hosoya | ............... | B60T 8/363 303/119.2 |
| 5,971,501 A * | 10/1999 | Hosoya | ............... | B60T 8/365 303/119.2 |
| 6,132,012 A * | 10/2000 | Ishii | ............... | 303/122.12 |
| 6,164,734 A * | 12/2000 | Otomo | ............... | B60T 7/042 188/1.11 E |
| 6,260,934 B1 * | 7/2001 | Lee | ............... | 303/192 |
| 6,347,842 B1 * | 2/2002 | Isono | ............... | B60T 8/367 188/356 |
| 6,361,126 B1 * | 3/2002 | Pueschel | ............... | B60T 8/442 303/113.3 |
| 6,450,591 B1 * | 9/2002 | Kawahata | ............... | B60T 8/3655 303/122.05 |
| 6,595,034 B1 * | 7/2003 | Crane et al. | ............... | 73/1.12 |
| 6,679,569 B2 * | 1/2004 | Schmidt et al. | ............... | 303/122.12 |
| 2001/0006308 A1 * | 7/2001 | Kawahata | ............... | B60T 8/367 303/122 |
| 2001/0028194 A1 * | 10/2001 | Isono et al. | ............... | 303/122 |
| 2003/0154014 A1 * | 8/2003 | Iwata et al. | ............... | 701/93 |
| 2004/0195050 A1 * | 10/2004 | Frentz et al. | ............... | 188/1.11 R |
| 2005/0035653 A1 * | 2/2005 | Godlewsky et al. | ............... | 303/122.03 |
| 2005/0187070 A1 * | 8/2005 | Takagi | ............... | 477/143 |
| 2007/0284935 A1 * | 12/2007 | Nomura | ............... | B60T 8/172 303/3 |
| 2008/0296967 A1 * | 12/2008 | Mori | ............... | B60T 8/36 303/11 |
| 2008/0300763 A1 * | 12/2008 | Mori | ............... | B60T 8/36 701/70 |
| 2009/0079258 A1 * | 3/2009 | Tsuruhara | ............... | B60T 8/3225 303/9.61 |
| 2009/0164082 A1 * | 6/2009 | Kobayashi et al. | ............... | 701/94 |
| 2011/0095880 A1 * | 4/2011 | Gaughan | ............... | 340/453 |
| 2012/0265418 A1 * | 10/2012 | Foerster et al. | ............... | 701/70 |
| 2013/0035835 A1 * | 2/2013 | Hachtel | ............... | B60T 8/3265 701/70 |
| 2013/0103279 A1 * | 4/2013 | Asano | ............... | B60T 8/1755 701/72 |
| 2013/0245909 A1 * | 9/2013 | Hirose | ............... | B60T 8/1764 701/73 |
| 2013/0261923 A1 * | 10/2013 | Harada | ............... | B60T 7/12 701/78 |
| 2013/0297179 A1 * | 11/2013 | Gruber et al. | ............... | 701/102 |

FOREIGN PATENT DOCUMENTS

| | | |
|---|---|---|
| JP | 11-34860 | 2/1999 |
| JP | 2007-112293 | 5/2007 |

* cited by examiner

MONITORING DEVICE FOR AT LEAST ONE SUBUNIT OF A HYDRAULIC BRAKING SYSTEM AND METHOD FOR EXAMINING A FUNCTIONAL CAPABILITY OF AT LEAST ONE SUBUNIT OF A HYDRAULIC BRAKING SYSTEM

CROSS REFERENCE TO RELATED APPLICATION

The present application is the national stage entry of International Patent Application No. PCT/EP2012/058601, filed on May 10, 2012, which claims priority to Application No. DE 10 2011 078 890.5, filed in the Federal Republic of Germany on Jul. 8, 2011.

FIELD OF INVENTION

The present invention relates to a monitoring system for at least one subunit of a hydraulic braking system. Furthermore, the present invention relates to a method for examining a functional capability of at least one subunit of a hydraulic braking system.

BACKGROUND INFORMATION

A braking system and a method for operating a braking system are described in German Application No. DE 10 2008 003 664. The affected braking system may have at least one pressure sensor, which is connected to a subunit of the braking system. With the aid of the pressure sensor, a pressure in the affected section of the braking system may be measured. In particular, the measured pressure value may also be taken into consideration during the execution of the method for operating the braking system.

SUMMARY

The present invention provides a monitoring device for at least one subunit of a hydraulic braking system and a method for examining a functional capability of at least one subunit of a hydraulic braking system.

The present invention ensures monitoring/examining of at least one subunit of a hydraulic braking system, in addition to a comparison of at least one pressure variable with respect to a pressure prevailing in the braking system to a predefined comparative value range, a comparison of a pressure change variable with respect to a time change of the pressure variable to a predefined minimum change variable may also be executed at least as needed. This represents an advantageous expansion of a conventional analysis of a measured actual pressure by comparison to a predefined setpoint pressure. By way of the additional use of the pressure change variable, which may include, for example, a quotient of a pressure difference and a time difference between a measurement of two pressure variables at two different times and/or a slope of the pressure variable, the necessity is dispensed with of separately taking into consideration the measuring time of the pressure variable compared to the comparison range during the analysis. As explained in greater detail hereafter, in particular disregarding the measuring time of a compared pressure variable may conventionally result in an incorrect analysis result. This error source and the outlay which is conventionally to be applied to avoid it may be bypassed with the aid of the present invention.

The present invention implements a maximum recognition quality in the monitoring/examining of at least one subunit of a hydraulic braking system. It may be ensured by this maximum recognition quality that a fault present in at least the subunit and/or a functional impairment of at least the subunit is recognizable rapidly. At the same time, the present invention ensures maximum robustness of the monitoring. In particular, the risk of incorrect response from the monitoring may be minimized with the aid of the monitoring device according to the present invention and the corresponding method for examining at least one subunit of a hydraulic braking system. This minimization of the risk is also ensured in the event of unfavorable hardware tolerances and disadvantageous operating states.

With the aid of the present invention, a monitoring function or an examining function may be designed more robustly, in that not only an absolute deviation of the pressure variable (actual pressure variable) from the comparative value range (the at least one setpoint pressure variable) is considered, but rather, at least in the case of a deviation beyond a deviation limit, a behavior of at least the subunit of the hydraulic braking system is also used for the evaluation. In particular, with the aid of the present invention, the pressure adaptation behavior of at least the subunit of the hydraulic braking system may be used, with the aid of which the presence of a fault/a functional impairment of at least the subunit of the hydraulic braking system is recognizable in a simple way.

It is to be noted that the implementability of the present invention only requires the sensor for providing the pressure variable as a sensor unit. Therefore, the necessity is dispensed with of additionally situating still a further sensor, for example, for measuring a temperature, on the braking system in addition to the at least one sensor for providing the pressure variable. In relation to conventional monitoring of a braking system on the basis of items of sensor information and/or models which are calculated/analyzed in a control unit, the present invention therefore offers the advantage that both the items of sensor information and the items of model information may be omitted. In this way, a substantial savings is ensured in hardware and development costs on the monitored/examined braking system, or on the at least one subunit of the braking system. In particular, the present invention, as explained in greater detail hereafter, may also differentiate a temperature-related pressure deviation from a non-temperature-related pressure deviation without direct consideration of the temperature prevailing in the hydraulic braking system. Therefore, if the present invention is used, the requirement of using conventional expensive hardware for recognizing temperature-dependent effects in a conventional braking system is also omitted in particular. Since the simulation of temperature-dependent effects in a hydraulic braking system is only implementable in sufficient quality with a comparatively high expenditure, the complex electronics for the conventional recognition of temperature-dependent effects may therefore be saved with the aid of the present invention. In addition, the present invention reduces the complexity of the monitoring or examining steps which are conventionally to be executed to monitor/examine a braking system, which is frequently linked to a positive influence on the product quality.

Further features and advantages of exemplary embodiments of the present invention are described herein with reference to the accompanying drawings.

DETAILED DESCRIPTION

Figure 1:
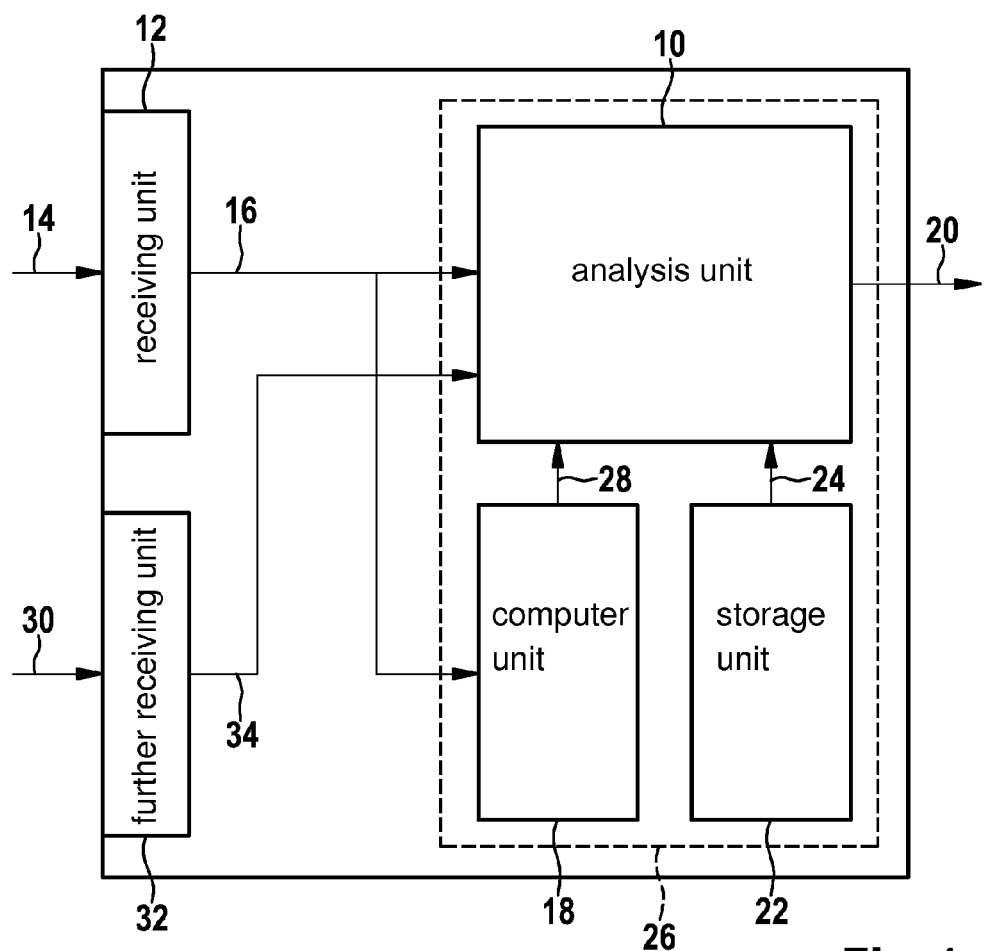
FIG. 1 shows a schematic view of one exemplary embodiment of the monitoring device according to the present invention.

FIG. 1 shows a schematic view of one exemplary embodiment of the monitoring device according to the present invention.

At least one subunit of a hydraulic braking system may be monitored with the aid of the monitoring device which is schematically shown in FIG. 1. Monitoring the at least one subunit may be understood, for example, as examining or checking the at least one subunit. The at least one subunit, which may be monitored, of the hydraulic braking system may therefore be, for example, an actuator/a final controlling device, for example, a pump, a plunger, a continuously adjustable/variable/controllable valve, and/or a storage chamber, in particular a high-pressure accumulator having a valve. With the aid of the monitoring device, it may be ascertained in particular whether the actuator or the final controlling device provides at least a minimum performance of a setpoint performance predefined by a controller. The usability of the monitoring device is not restricted to the examples mentioned here, however. For example, it may also be ascertained with the aid of the monitoring device whether the hydraulic braking system has a leak.

The monitoring device described hereafter may be used in particular in a hybrid vehicle or an electric vehicle. Braking systems which are designed at least partially as a brake-by-wire system are being used increasingly in hybrid vehicles or electric vehicles. Such braking systems may have, for example, at least one brake circuit, which is "hydraulically disconnectable/separable" from the brake master cylinder by closing a valve. Such a braking system may also be designed such that the driver only brakes into a pedal travel simulator, while the pressure in the at least one brake circuit is set in a manner controlled by the brake force. In such a braking system, the driver may be partially decoupled from the at least one brake circuit. In particular in the case of such decoupling, it is advantageous if at least one monitoring function is integrated into a controller of the braking system, for example, to monitor a buildup of a brake pressure requested by the driver or an automatic vehicle controller. Therefore, the monitoring device described hereafter may be used in particular for the purpose of recognizing a malfunction of at least one subunit of the braking system in a braking system of a hybrid vehicle or electric vehicle. Optionally, the monitoring device may also be used for the purpose in this case, after a recognition of the malfunction, of controlling the braking system in a safe operating mode, which may also be designated as a safe degraded state of the braking system. The usability of the monitoring device described hereafter is not restricted to a hybrid vehicle or an electric vehicle, however.

The monitoring device which is schematically shown in FIG. 1 includes at least one analysis unit 10, which is designed for the purpose of comparing at least one pressure variable, which is provided by a sensor, of a pressure prevailing in the hydraulic braking system to a predefined comparative value range having at least one comparative value. For example, the monitoring device may have a receiving unit 12, to which the sensor (not shown) provides a sensor signal 14 having the pressure variable ascertained thereby. Receiving unit 12 may subsequently relay a pressure variable signal 16 having the pressure variable provided by the sensor to analysis unit 10. In this case, the monitoring device may also be situated spaced apart from the sensor for ascertaining the pressure variable. This makes it easier to attach the sensor for ascertaining the at least one pressure variable close to at least the one subunit to be examined of the hydraulic braking system, which makes reliable examination of the subunit easier. As an alternative thereto, however, the sensor may also be situated as an integral part of the monitoring device in its housing.

The at least one pressure variable may be a pressure value, for example. Therefore, in particular a pressure sensor is usable for ascertaining the pressure variable. However, the sensor may also be designed for the purpose of also providing, instead of a pressure value, in particular in Pascal or bar, a variable as a pressure variable, which is convertible into a pressure value via an analysis relation.

It is to be noted that the usability of the sensor is not only restricted to providing the pressure variable to analysis unit 10. Instead, the sensor may also be used for the purpose of providing items of information with respect to a pressure prevailing in the hydraulic braking system, or with respect to a pressure prevailing in at least one part of the hydraulic braking system, also to at least one further vehicle component.

Analysis unit 10 is additionally designed for the purpose of comparing a pressure change variable, which is provided by a computer unit 18, with respect to a time change of the pressure variable to a predefined minimum change variable. Analysis unit 10 is also designed for the purpose, in consideration of the comparison of the pressure variable to the predefined comparative value range and the comparison of the pressure change variable to the predefined minimum change variable, of outputting an output signal 20 having an item of information with respect to a functional capability of at least the examined subunit of the hydraulic braking system. The comparative values of the comparative value range which are used by analysis unit 10 for the comparison and the minimum change variable may be stored on a storage unit 22, for example, and provided to analysis unit 10 with the aid of a comparative value signal 24.

Computer unit 18 is preferably designed for the purpose of establishing the pressure change variable in consideration of at least two pressure variables provided by the sensor. The pressure change variable may be, for example, a quotient of a difference of two pressure variables provided by the sensor and the time interval between the ascertainment of the two provided pressure variables. Computer unit 18 may also be designed for the purpose of reading out the pressure variables provided by the sensor at a fixedly predefined frequency and establishing the difference between the subsequently read-out pressure variables as a pressure change variable. Therefore, in an advantageous design of the function of computer unit 18, the pressure change variable may also be designated as a pressure variable gradient, a pressure gradient, a pressure increase, and/or a pressure variable increase.

In one advantageous exemplary embodiment, the monitoring device includes computer unit 18. In this case, it is not necessary to design computer unit 18 as a unit which is spatially separate from analysis unit 10. For example, analysis unit 10 and computer unit 18 may also be shared/integrated into electronics 26 of the monitoring device. Pressure change variable signal 28 may also be provided by computer unit 18 to analysis unit 10, however, if computer unit 18 is situated/designed externally from the monitoring device.

Analysis unit 10 is preferably designed for the purpose, if the pressure variable is in the predefined comparative value range and/or if the pressure change variable is greater than the predefined minimum change variable, of outputting output signal 20 having an item of information, that at least the examined subunit of the hydraulic braking system is in a functional state, as the item of information with respect to the functional capability. Correspondingly, analysis unit 10 may also be designed for the purpose, if the pressure variable deviates from the predefined comparative value range and the pressure change variable is less than the predefined minimum change variable, of outputting output signal 20 having an item of information, that at least the examined subunit of the hydraulic braking system is in a function-impaired state, as the item of information with respect to the functional capability. The advantages of establishing the item of information output with the aid of output signal 20 in this way will be discussed in greater detail in the description of the following figures.

In one advantageous refinement, analysis unit 10 may additionally be designed for the purpose, at least if the pressure variable deviates from the predefined comparative value range and the pressure change variable is greater than the predefined minimum change variable, of comparing the pressure variable to a predefined minimum variable. The minimum variable may be stored on storage unit 22, for example, and may be provided via comparative value signal 24 to analysis unit 10.

As an alternative or supplement to the design described in the above paragraph, analysis unit 10 may additionally be designed for the purpose, at least if the pressure variable deviates from the predefined comparative value range and the pressure change variable is greater than the predefined minimum change variable, of comparing an activation variable, which is provided by a control unit (not shown) of at least the examined subunit of the hydraulic braking system, to a predefined activation threshold value. A data signal 30 having the activation variable may be received, for example, by a further receiving unit 32 of the monitoring device. Subsequently, an activation variable signal 34 having the activation variable may be provided by further receiving unit 32 to analysis unit 10. The activation threshold value may also be stored on storage unit 22 and may be provided with the aid of comparative value signal 24 to analysis unit 10.

In the case of the advantageous refinement of analysis unit 10 described in the two preceding paragraphs, it is advantageous if it is additionally designed for the purpose, if the pressure variable is less than the predefined minimum variable and/or the activation variable is less than the predefined activation threshold value, of outputting output signal 20 with the item of information that at least the examined subunit of the hydraulic braking system is in a function-impaired state. Analysis unit 10 may accordingly also be designed for the purpose, if the pressure variable is greater than the predefined minimum variable and the activation variable is greater than the predefined activation threshold value, of outputting output signal 20 with the item of information that at least the examined subunit of the hydraulic braking system is in a functioning state. The advantages of the refinement of the monitoring device described here will be discussed in greater detail in the description of the following figures.

Output signal 20 may be provided, for example, to a warning device for an image display and/or an audio output for warning a driver of a vehicle equipped with the monitoring device about the functional impairment of at least the subunit of the hydraulic braking system. Optionally, with the aid of a transmitting unit, after receiving output signal 20, an item of information with respect to the functional impairment of at least the subunit of the hydraulic braking system may be transmitted to a repair shop. The item of information transmitted with the aid of output signal 20 may also be stored on an internal data storage unit of the vehicle. This may make later repair of the braking system easier. Output signal 20 may also preferably be provided to a control device (not shown) of the braking system. In this case, it is advantageous if the control device is designed for the purpose, in the event of an activation of the hydraulic braking system, of taking into consideration the item of information which is relayed via output signal 20 with respect to the functional capability of at least the subunit of the hydraulic braking system. For example, after receiving output signal 20 having an item of information with respect to a leak existing in the braking system, the control device may switch at least one valve into a closed state.

The control device is advantageously designed for the purpose, in the case of the control of the hydraulic braking system in consideration of the item of information relayed with the aid of output signal 20, of also controlling at least the subunit of the braking system after the occurrence of a functional impairment such that the driver may still bring the vehicle which is equipped with the monitoring device safely to a standstill. Since the method steps executed by the control device in this case are not the subject matter of the technology according to the present invention, this will not be discussed in greater detail here.

The monitoring device may be designed in particular as an integral part of the control device for controlling the hydraulic braking system. For example, the monitoring device may also be a component of a central vehicle controller.

Analysis unit 10 may additionally be designed for the purpose of executing the analysis functions which are schematically shown in the further figures. Therefore, reference is made to the description of the following figure with respect to further analysis functions executable with the aid of analysis unit 10.

Figure 2:
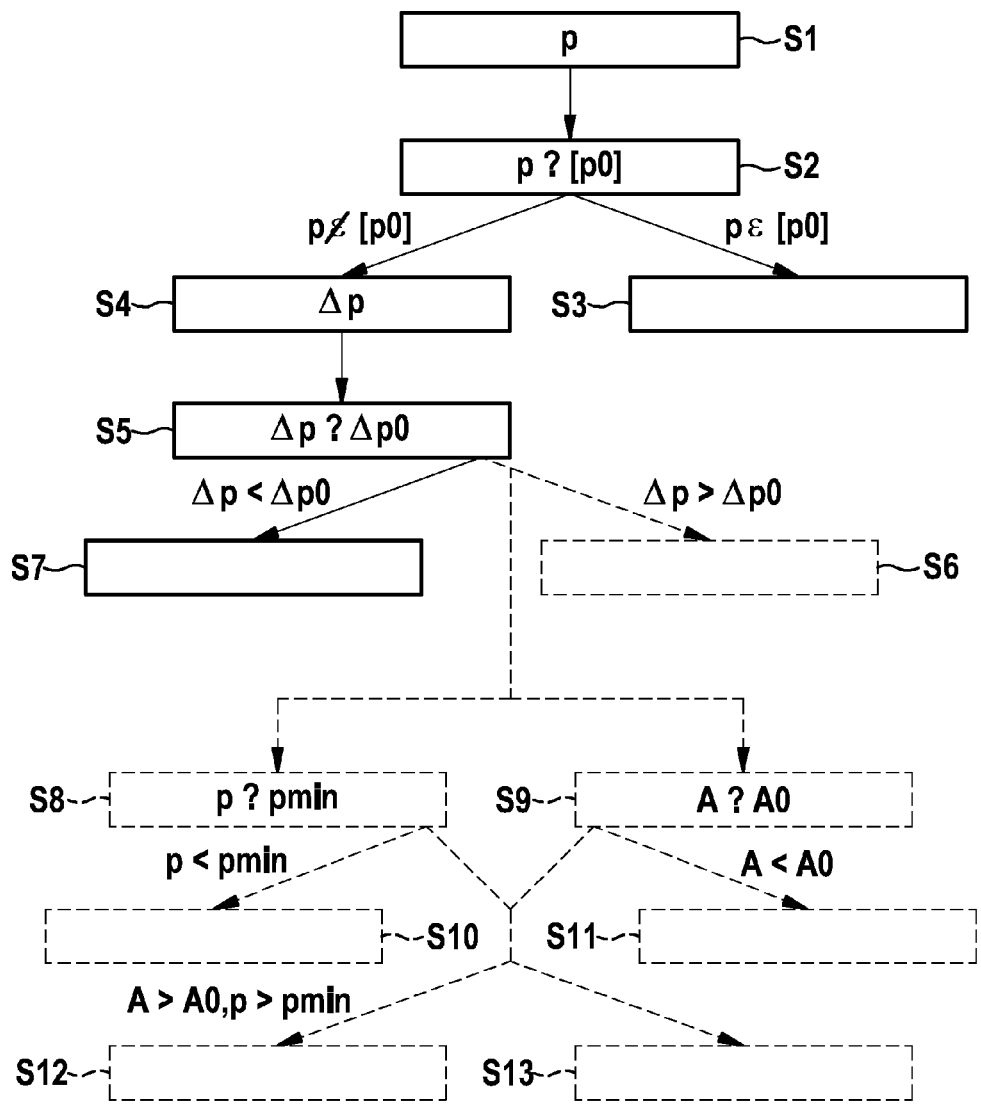
FIG. 2 shows a flow chart to illustrate a first exemplary embodiment of the method according to the present invention.

FIG. 2 shows a flow chart to illustrate a first exemplary embodiment of the method according to the present invention.

The method which is schematically shown on the basis of FIG. 2 is executable for examining/checking/monitoring a functional capability of at least one subunit of a hydraulic braking system. Examples of a subunit of the hydraulic braking system which may be monitored with the aid of the method have already been described above.

In a method step S1, at least one pressure variable p of a pressure prevailing in the hydraulic braking system is ascertained. Reference is made to the above-described exemplary embodiments with respect to the examples of ascertained pressure variable p. In a following method step S2, ascertained pressure variable p is compared to a predefined comparative value range [p0] having at least one comparative value p0. For example, it may be examined whether ascertained pressure variable p is in predefined comparative value range [p0].

In the method which is schematically shown in FIG. 2, the functional capability of at least the examined subunit of the hydraulic braking system is established at least in consideration of the comparison of pressure variable p to predefined comparative value range [p0]. This is implementable, for example, by executing method step S3 after establishing that ascertained pressure variable p is in comparative value range [p0]. In method step S3, it may be established in this case that at least the examined subunit of the hydraulic braking system is in a functional state.

Preferably, method steps S4 and S5 described hereafter are only executed if ascertained pressure variable p deviates from predefined comparative value range [p0], i.e., if ascertained pressure variable p is not in comparative value range [p0]. Of course, method steps S4 and S5 may also be executed independently of the result of method step S2, however.

In a method step S4, a pressure change variable Δp with respect to a time change of pressure variable p is ascertained. Examples of pressure change variable Δp, which is ascertained in method step S4, have already been listed above. In a following method step S5, ascertained pressure change variable Δp is compared to a predefined minimum change variable Δp0. The predefined minimum change variable may be, for example, a desired minimum increase of pressure variable p and/or a minimum gradient of pressure variable p to be required for advantageous operation of the hydraulic braking system. At least if ascertained pressure variable p deviates from predefined comparative value range [p0], the establishment of the functional capability of at least the examined subunit is therefore also carried out in consideration of the comparison of pressure change variable Δp to predefined minimum change variable Δp0.

If it is established in method step S5 that pressure change variable Δp is greater than predefined minimum change variable Δp0, in spite of a deviation of ascertained pressure variable p from comparative value range [p0], it may be established in a method step S6 that at least the examined subunit of the hydraulic braking system is in a functional state. (Method step S6 may therefore correspond to method step S3.) Instead of method step S6, however, other method steps described in greater detail hereafter may also be executed.

If ascertained pressure variable p deviates from predefined comparative value range [p0] and pressure change variable Δp is less than predefined minimum change variable Δp0, in addition, it may be established in a method step S7 that at least the examined unit of the hydraulic braking system is in a function-impaired state.

In one refinement of the method, at least if pressure variable p deviates from predefined comparative value range [p0] and pressure change variable Δp is greater than predefined minimum change variable Δp0, a method step S8 may also be executed (instead of method step S6). In method step S8, pressure variable p is compared to a predefined minimum variable pmin. Minimum variable pmin may be a pressure variable p, below which advantageous operation of at least the examined subunit of the braking system is no longer to be expected with a sufficiently high probability. For example, minimum variable pmin may correspond to a pressure variable p which exists in the event of the presence of a leak, a function failure of a pump, a function failure of a valve, a non-functionality of a plunger, and/or a malfunction of a storage chamber (generally/often).

As an alternative or as a supplement to method step S8, a method step S9 may also be executed. This may also be described such that method step S9 is executed, at least if pressure variable p deviates from predefined comparative value range [p0] and pressure change variable Δp is greater than predefined minimum change variable Δp0. In method step S9, an activation variable A of a control signal provided to the examined subunit of the hydraulic braking system is compared to a predefined activation threshold value A0. Activation variable A may be a manipulated variable output by a controller to a subunit of the braking system, for example, in particular a setpoint pump coefficient or a setpoint speed of a delivery pump. Activation threshold value A0 is preferably a control limit of the subunit activated with the aid of the controller, for example, the control limit of the delivery pump at a high speed. In method step S9 it may be ascertained, for example, whether a delivery pump used as an actuator is operating at a high speed close to the control limit. If it is then established that pressure change variable Δp is greater than predefined minimum change variable Δp0, for example, because the gradient of pressure variable p exceeds a certain threshold value predefined as minimum change variable Δp0, it may be inferred therefrom that in spite of an instantaneous deviation of pressure variable p from predefined comparative value range [p0], this deviation will be overcome within a comparatively short time and is therefore not to be considered a fault.

It is therefore to be noted that method steps S8 and S9 may also be executed independently of the results of method steps S2 and S4. For example, method steps S8 and S9 may also be executed instead of at least one of method steps S3 and S7.

In a preferred exemplary embodiment, if pressure variable p is less than predefined minimum variable pmin, a method step S10 is executed, in which it is established that at least the examined subunit of the braking system is in a function-impaired state. Accordingly, if it is established in method step S9 that activation variable A is less than predefined activation threshold value A0, it may be established in a method step S11 that at least the examined subunit of the hydraulic braking system is in a function-impaired state.

If the two method steps S8 and S9 are executed jointly, and it is established that pressure variable p is greater than predefined minimum variable pmin and activation variable A is greater than predefined activation threshold value A0, a method step S12 may be executed, in which it is established that at least the examined subunit of the hydraulic braking system is in a functional state. Otherwise, a method step S13 may also be executed, in which it is established that at least the examined subunit of the hydraulic braking system is in a function-impaired state.

Accordingly, also if only one of the two method steps S8 and S9 is executed, in the case of a pressure variable p greater than predefined minimum variable pmin or in the case of an activation variable A greater than predefined activation threshold value A0, a system degradation and/or a driver warning may be omitted. However, if a certain minimum pressure pmin is not set in the system or the actuator does not operate close to control limit A0, it may be inferred that a (more serious) fault, such as a leak, is present in the braking system.

The method described here offers an advantageous (indirect) consideration of factors, for example, the temperature prevailing in the braking system and/or the viscosity of the brake fluid, which influence the flow speed of the brake fluid and therefore the rapid response of the braking system, without these factors having to be ascertained for this purpose. In particular with the aid of the comparison of pressure change variable Δp to predefined minimum change variable Δp0, the factors may be considered indirectly in the monitoring, without having to be ascertained previously for this purpose. The execution of the method therefore also does not require equipping the braking system with a sensor for ascertaining such factors.

In particular at low temperatures, a substantial lengthening of pressure buildup times and pressure dissipation times is also to be considered in a hydraulic braking system, which are caused by the strongly increasing viscosity of the brake fluid. Therefore, the risk conventionally exists that due to the low temperature, a slowed-down pressure buildup will incorrectly be evaluated as a fault state of at least one subunit of the hydraulic braking system. This risk conventionally often results in the fact that as a consequence of the slowed-down pressure buildup which is misinterpreted as a fault state, an incorrect/unnecessary fault signal is output and/or the system is degraded due to a fault which only apparently occurs.

To minimize this risk, according to the related art, a waiting time is therefore frequently established, before monitoring a hydraulic braking system, in consideration of at least one surroundings condition, for example, the temperature. During the subsequent monitoring, after a specification of a new setpoint pressure, the established waiting time is first waited out before it is ascertained whether an ascertained actual pressure results within the established waiting time corresponding to the new setpoint pressure, or within a defined fault band around the new setpoint pressure. After a recognition of a comparatively low temperature, for example, a significantly longer waiting time may be waited out until the setpoint-actual pressure value comparison.

This procedure may also be described such that before the setpoint-actual pressure value comparison, the surroundings-related/environment-related state of the braking system is detected with the aid of at least one sensor and/or a model function and subsequently the monitoring function is adapted accordingly/in a situation-related way. This conventional procedure has the disadvantage that still further sensors and/or models are necessary, in addition to a pressure sensor, for providing the items of information to be considered in addition to pressure variable p for the monitoring/examining.

This conventionally significantly increases the outlay for hardware, computer resources, and/or development services for the monitoring/examining of at least one subunit of the hydraulic braking system. This increased outlay is linked to an increase of the costs and/or overall space required for the conventional monitoring.

In contrast, the above-described method (with the aid of method steps S4 and S5) offers a consideration of pressure change variable $\Delta p$, for example, the gradient/the slope of pressure variable p. With the aid of these method steps S4 and S5, it is therefore at least recognizable whether the hydraulic braking system changes the pressure in the desired direction. Optionally, the consideration of pressure change variable $\Delta p$ may be carried out in particular if it is recognized that activation variable A is greater than predefined activation threshold value A0. For example, it is recognizable with the aid of this procedure that the hydraulic braking system is located at the control limit and the brake pressure runs in the desired direction. As an alternative or supplement thereto, the non-evaluation of a deviation of pressure variable p from comparative value range [p0] may also be made dependent on whether a certain minimum pressure pmin is still at least prevailing in the system. The advantageous indirect consideration of the at least one surroundings factor which influences the rapid reaction of the braking system is already ensured, however, if only method steps S1 through S5 are executed.

With the aid of method steps S4 and S5, the necessity, which is conventionally to be maintained, of waiting out the waiting time before a setpoint-actual value comparison is also dispensed with. It is therefore also possible with the aid of the present method to recognize a degradation of the hydraulic braking system rapidly and accordingly to react early thereto.

In addition, the steps to be executed during the execution of the method are comparatively easy computing steps, in particular frequently only comparisons. Therefore, the execution of the method does not require complex electronics for managing complicated computing steps, in particular model calculations. The method described here therefore allows a reduction of the costs and the overall space requirement of the components to be provided for examining the functional capability of at least one subunit of a hydraulic braking system.

It is to be noted that the ability to execute the method described here is not restricted to the schematically shown weighting of the results of the individual comparison steps. For example, method step S12 may also be executed if at least pressure variable p is greater than predefined minimum variable pmin or activation variable A is greater than predefined activation threshold value A0. The results of method steps S5, S8, and/or S9 may also be analyzed with one another in a balanced manner. For example, it may be sufficient in this case that at least one of the values compared in method steps S5, S8, and/or S9 is greater than the comparative value, to execute method step S12. Method steps S4 and S5 may also be executed in spite of a pressure variable p which is in comparative value range [p0]. In this case, for example, in spite of pressure variable p which is in comparative value range [p0], method step S7 may be executed in the event of a pressure change variable $\Delta p$ less than predefined minimum change variable $\Delta p0$. Further examples of a different weighting of the comparison results are also possible.

The method shown in FIG. 2 offers a reliable (maximum) recognition quality of the monitoring thus carried out, faults being recognized comparatively rapidly. In particular, it is not necessary during the execution of the method to wait out a time, which is dependent on certain factors which may impair the reaction speed of the braking system, until a comparison of ascertained pressure variable p may be started. In addition, the method offers maximum robustness of the monitoring, since faulty response from the monitoring is not a concern even in the event of unfavorable hardware tolerances and operating states, for example, in the event of a low temperature or a high temperature.

The faults which the hydraulic braking system has may additionally be derived from the analysis executable with the aid of the method of FIG. 2. Such a fault analysis is executable with the aid of the predefinable limits. Depending on the fundamental system design and a preferred monitoring, in some cases, a significant increase in robustness of the monitoring may therefore be achieved, without impairing the recognition quality of the relevant fault states.

Figure 3A:
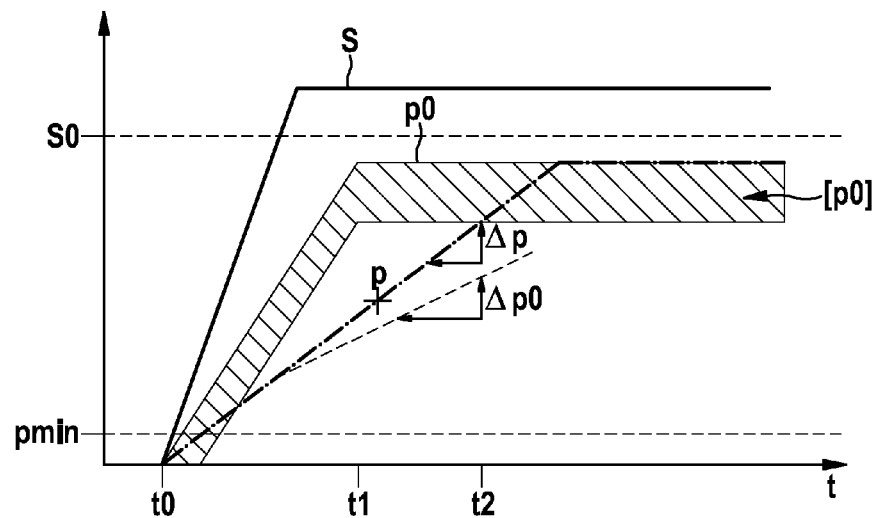
FIGS. 3A and 3B show two coordinate systems to explain a second exemplary embodiment of the method according to the present invention.
Figure 3B:
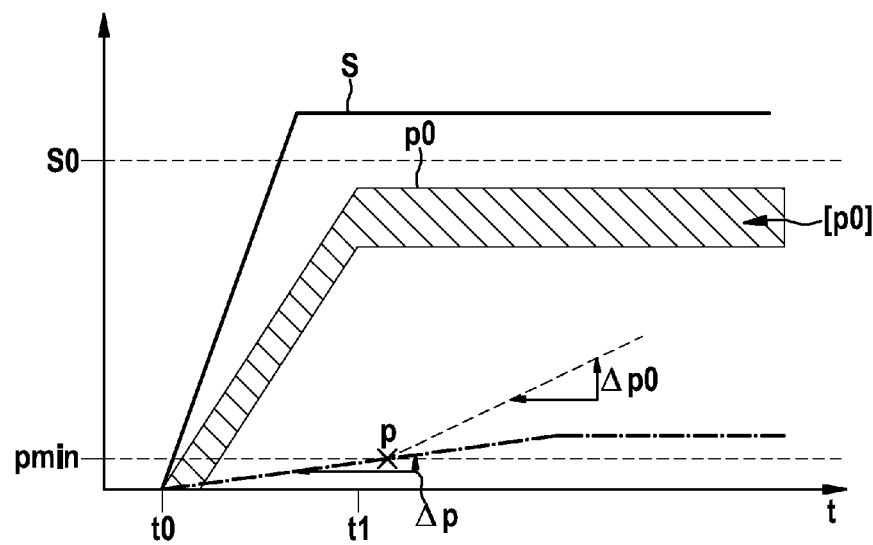

FIGS. 3A and 3B show two coordinate systems to explain a second exemplary embodiment of the method according to the present invention.

In the coordinate systems of FIGS. 3A and 3B, the abscissas are time axis t. The ordinates of the coordinate systems of FIGS. 3A and 3B show pressure values and actuator request values.

The coordinate systems of FIGS. 3A and 3B illustrate a situation in which an actuator of a hydraulic braking system operated with the aid of the method, for example, a delivery pump, is activated at a point in time t0 at a very low temperature. For this purpose, at point in time t0, a control signal having an actuator request S not equal to 0 is output as an activation variable by a control device of the hydraulic braking system to the actuator. With the aid of the method described hereafter, it is to be examined/checked whether the activated actuator reliably executes its function and/or is in a functional state.

Due to the very low temperature, the braking system displays a significantly slowed-down reaction capability to the actuator request in both FIGS. 3A and 3B. FIG. 3A shows the reaction of a functioning actuator, which (in spite of the slowdown due to the comparatively low temperature) reliably executes the control command. Therefore, at a point in time t1, an ascertained pressure value p does still significantly deviate from a tolerance value range [p0], which is predefined as a comparative value range, less than a predefined setpoint value p0, however, with the aid of the advantageous method, further comparative values may be used, on the basis of which the functional capability of the actuator may be established. For example, for pressure variable p, a gradient/a slope may be ascertained as a pressure change variable $\Delta p$, which is significantly greater than a predefined minimum change variable $\Delta p0$. It is also recognizable that pressure value p at point in time t1 is greater than a predefined minimum variable pmin. Furthermore, it may be established that at point in time t1, actuator request S is greater than a predefined activation threshold value S0.

Due to pressure change variable $\Delta p$ greater than minimum change variable $\Delta p0$, pressure variable p greater than minimum variable pmin, and actuator request S from activation threshold value S0, it may therefore be inferred in spite of a deviation of pressure variable p from comparative value range [p0] at point in time t1 that this deviation is only to be attributed to a delay existing due to the low temperature and therefore the existence of a fault or a functional impairment in the braking system does not have to be presumed. In fact, pressure variable p reaches tolerance value range [p0] at point in time t2. It may therefore be established with the aid of the method that the braking system, which has its full functional capability, only reacts with a delay. It is to be noted that with the aid of the examination shown in FIG. 3A and the interpretation resulting therefrom of the time deviation as temperature-related, it is also recognizable without a temperature sensor that a low temperature prevails in the braking system.

FIG. 3B shows a situation in which a monitoring-relevant fault exists in the hydraulic braking system. Such a fault may be a leak, for example. In such a situation, pressure value p deviates significantly at point in time t1 from setpoint value p0 and tolerance value range [p0]. In addition, pressure change variable $\Delta p$ is significantly less than minimum change variable $\Delta p0$. Actuator request S is greater than request threshold value S0, but nonetheless it may not be expected that comparative value range [p0] will be reached by pressure variable p at a later point in time after t1.

The method is therefore designed for the purpose of recognizing the conditions of the minimum threshold and the minimum gradient as infringed. The driver may therefore be informed about the deviation from the normal behavior of the hydraulic braking system. In addition, the hydraulic braking system may be controlled in a fault mode, which may also be designated as a degradation of the hydraulic braking system.

With the aid of the method shown on the basis of FIGS. 3A and 3B, reliable monitoring of at least one subunit of a braking system is therefore executable. The design and/or weighting of the variables and limiting values to be observed may be individually established in the case of the particular execution of the method. It is to be noted once again that the selection, design, and/or weighting schematically shown in FIGS. 3A and 3B are not to be considered to be restrictive. Instead, the selection, design, and/or weighting may be adapted individually to a certain vehicle type, braking system type, and/or to a preferred fault analysis of the hydraulic braking system.

The invention claimed is:

1. A monitoring device for at least one subunit of a hydraulic braking system, comprising:
    an analysis unit comparing at least one pressure variable, which is provided by a sensor, of a pressure prevailing in the hydraulic braking system to a predefined comparative value range having at least one comparative value;
    wherein the analysis unit additionally compares a pressure change variable, which is provided by a computer unit, with respect to a time change of the pressure variable to a predefined minimum change variable, and, in consideration of the comparison of the pressure variable to the predefined comparative value range and the comparison of the pressure change variable to the predefined minimum change variable, outputs an output regarding a functional capability of at least the examined subunit of the hydraulic braking system;
    wherein
        (a) the analysis unit outputs, if at least one of (i) the pressure variable is in the predefined comparative value range, and (ii) the pressure change variable is greater than the predefined minimum change variable, the output signal indicating that at least the examined subunit of the hydraulic braking system is in a functional state; and
        (b) the analysis unit outputs, if (iii) the pressure variable deviates from the predefined comparative value range, and (iv) the pressure change variable is less than the predefined minimum change variable, the output signal indicating that at least the examined subunit of the hydraulic braking system is in a function-impaired state.

2. The monitoring device according to claim 1, wherein the computer unit establishes the pressure change variable in consideration of at least two pressure variables provided by the sensor.

3. The monitoring device according to claim 1, wherein the analysis unit additionally compares, at least if the pressure variable deviates from the predefined comparative value range, and if the pressure change variable is less than the predefined minimum change variable, the pressure variable to a predefined minimum variable.

4. A monitoring device for at least one subunit of a hydraulic braking system, comprising:
    an analysis unit comparing at least one pressure variable, which is provided by a sensor, of a pressure prevailing in the hydraulic braking system to a predefined comparative value range having at least one comparative value;
    wherein the analysis unit additionally compares a pressure change variable, which is provided by a computer unit, with respect to a time change of the pressure variable to a predefined minimum change variable, and, in consideration of the comparison of the pressure variable to the predefined comparative value range and the comparison of the pressure change variable to the predefined minimum change variable, outputs an output signal regarding a functional capability of at least the examined subunit of the hydraulic braking system;

wherein the analysis unit additionally compares, at least if the pressure variable deviates from the predefined comparative value range, and if the pressure change variable is greater than the predefined minimum change variable, an activation variable, which is provided by a control unit of at least the examined subunit of the hydraulic braking system, to a predefined activation threshold value.

5. The monitoring device according to claim 4, wherein the analysis unit outputs, if at least one of (i) the pressure variable is less than the predefined minimum variable, and (ii) the activation variable is less than the predefined activation threshold value, the output signal indicating that at least the examined subunit of the hydraulic braking system is in a function-impaired state.

6. A method for examining a functional capability of at least one subunit of a hydraulic braking system, comprising:
  ascertaining at least one pressure variable of a pressure prevailing in the hydraulic braking system;
  comparing the ascertained pressure variable to a predefined comparative value range having at least one comparative value;
  ascertaining a pressure change variable with respect to a time change of the pressure variable at least if the ascertained pressure variable deviates from the predefined comparative value range;
  comparing the ascertained pressure change variable to a predefined minimum change variable; and
  establishing the functional capability of at least the examined subunit of the hydraulic braking system in consideration of at least one of the comparison of the pressure variable to the predefined comparative value range, and the comparison of the pressure change variable to the predefined minimum change variable;
  wherein
    (a) if at least one of (i) the ascertained pressure variable is in the predefined comparative value range, and (ii) the pressure change variable is greater than the predefined minimum change variable, determining that at least the examined subunit of the hydraulic braking system is in a functional state; and
    (b) if the ascertained pressure variable deviates from the predefined comparative value range and the pressure change variable is less than the predefined minimum change variable, determining that at least the examined subunit of the hydraulic braking system is in a function-impaired state.

7. The method according to claim 6, wherein, at least if the pressure variable deviates from the predefined comparative value range and the pressure change variable is greater than the predefined minimum change variable, the pressure variable is compared to a predefined minimum variable.

8. A method for examining a functional capability of at least one subunit of a hydraulic braking system, comprising:
  ascertaining at least one pressure variable of a pressure prevailing in the hydraulic braking system;
  comparing the ascertained pressure variable to a predefined comparative value range having at least one comparative value;
  ascertaining a pressure change variable with respect to a time change of the pressure variable at least if the ascertained pressure variable deviates from the predefined comparative value range;
  comparing the ascertained pressure change variable to a predefined minimum change variable; and
  establishing the functional capability of at least the examined subunit of the hydraulic braking system in consideration of at least one of the comparison of the pressure variable to the predefined comparative value range, and the comparison of the pressure change variable to the predefined minimum change variable;
  wherein, at least if the pressure variable deviates from the predefined comparative value range and the pressure change variable is greater than the predefined minimum change variable, an activation variable of a control signal provided to the examined subunit of the hydraulic braking system is compared to a predefined activation threshold value.

9. The method according to claim 8, wherein, if at least one of (i) the pressure variable is less than the predefined minimum variable and (ii) the activation variable is less than the predefined activation threshold value, it is established that at least the examined subunit of the hydraulic braking system is in a function-impaired state.

* * * * *